July 12, 1949.   C. W. GOODWIN ET AL   2,475,740
ONE-REVOLUTION CLUTCH
Filed April 23, 1946   3 Sheets-Sheet 1
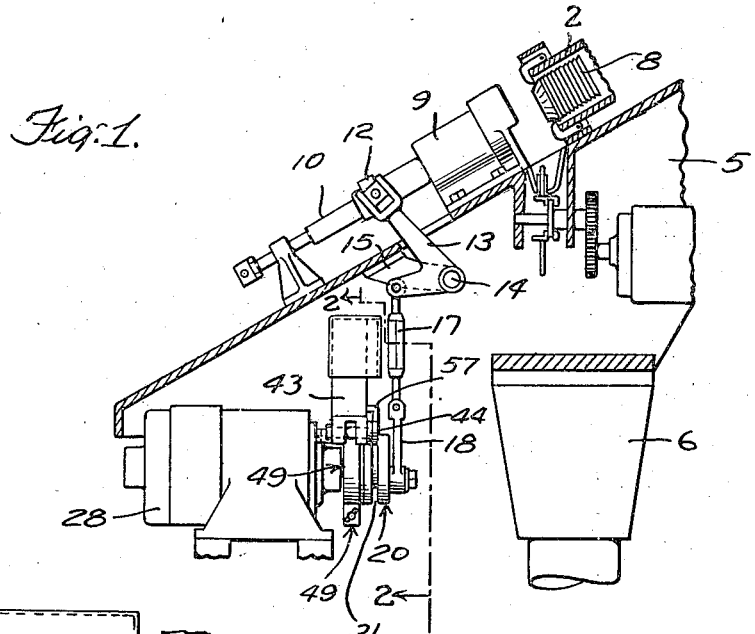
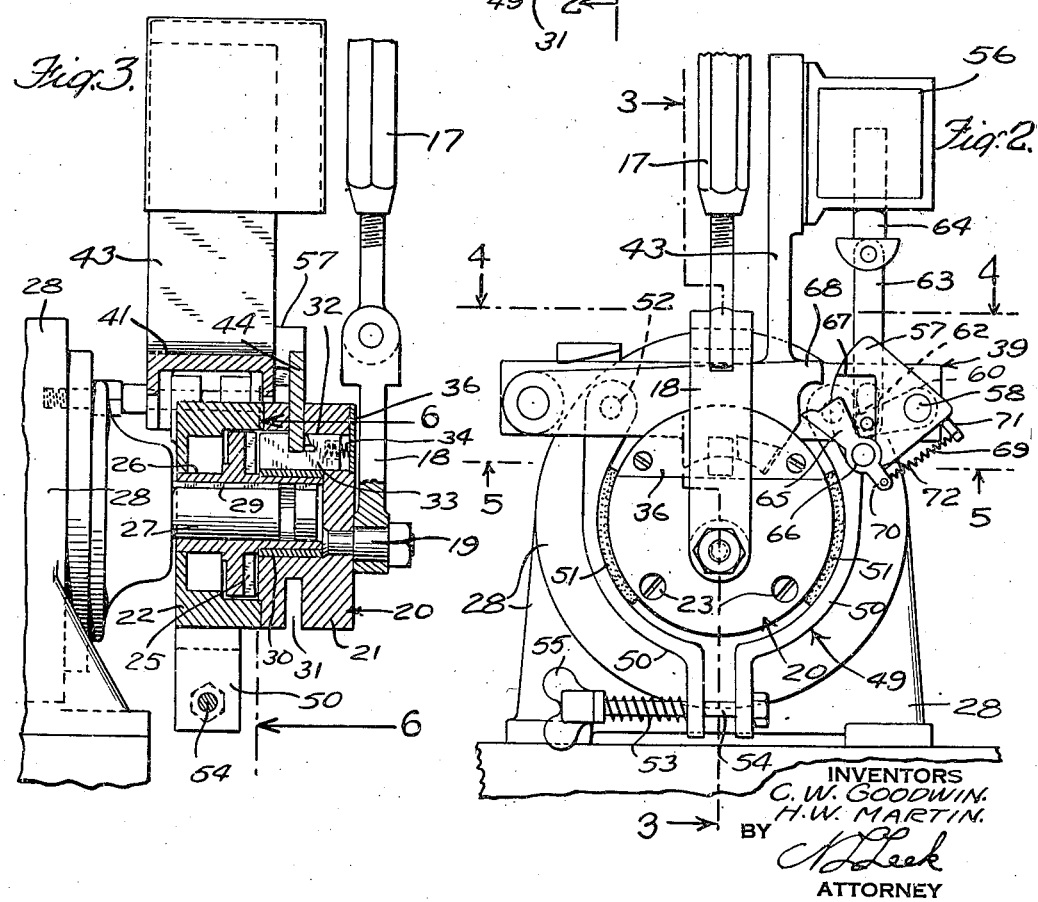
INVENTORS
C. W. GOODWIN.
H. W. MARTIN.
BY
ATTORNEY

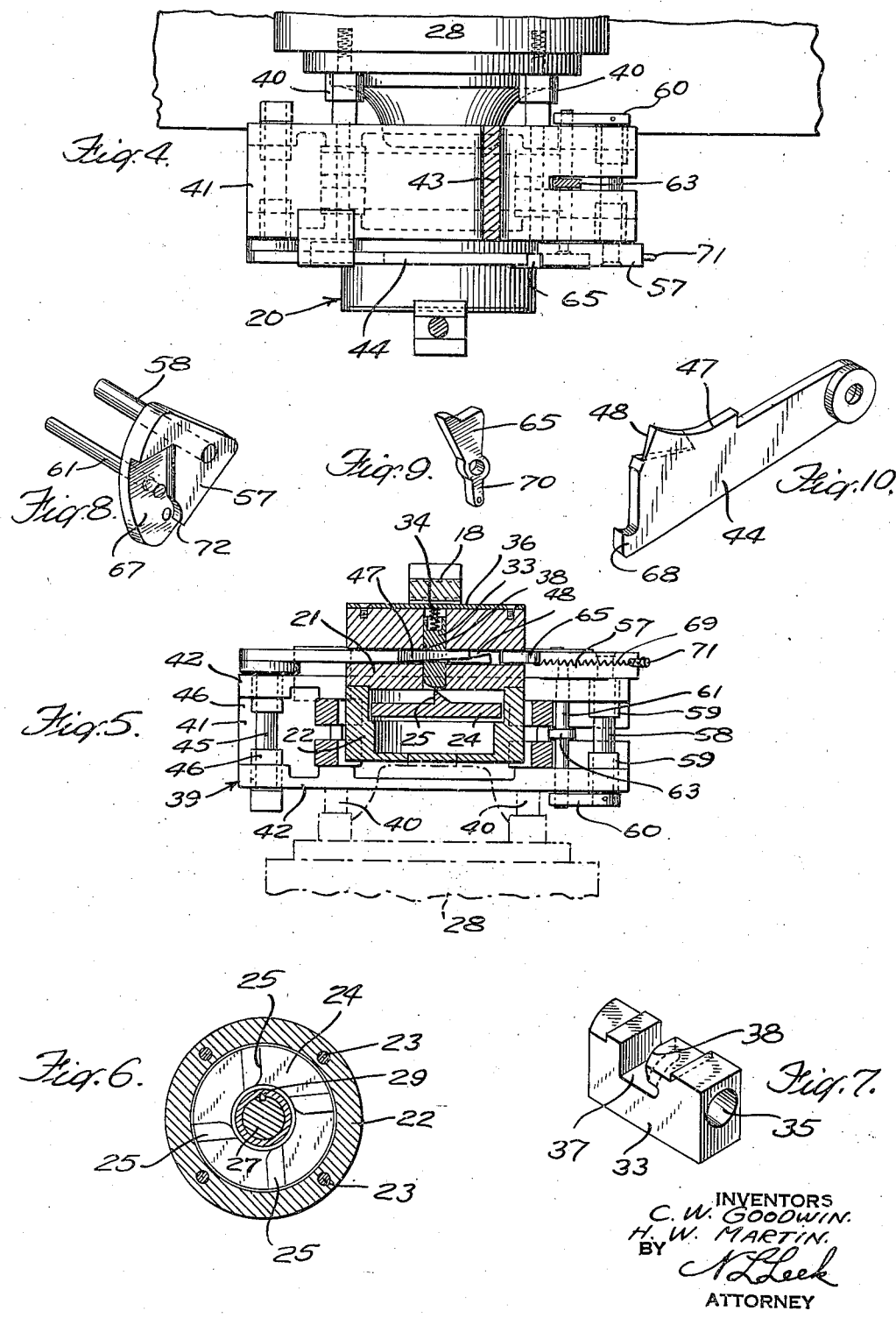

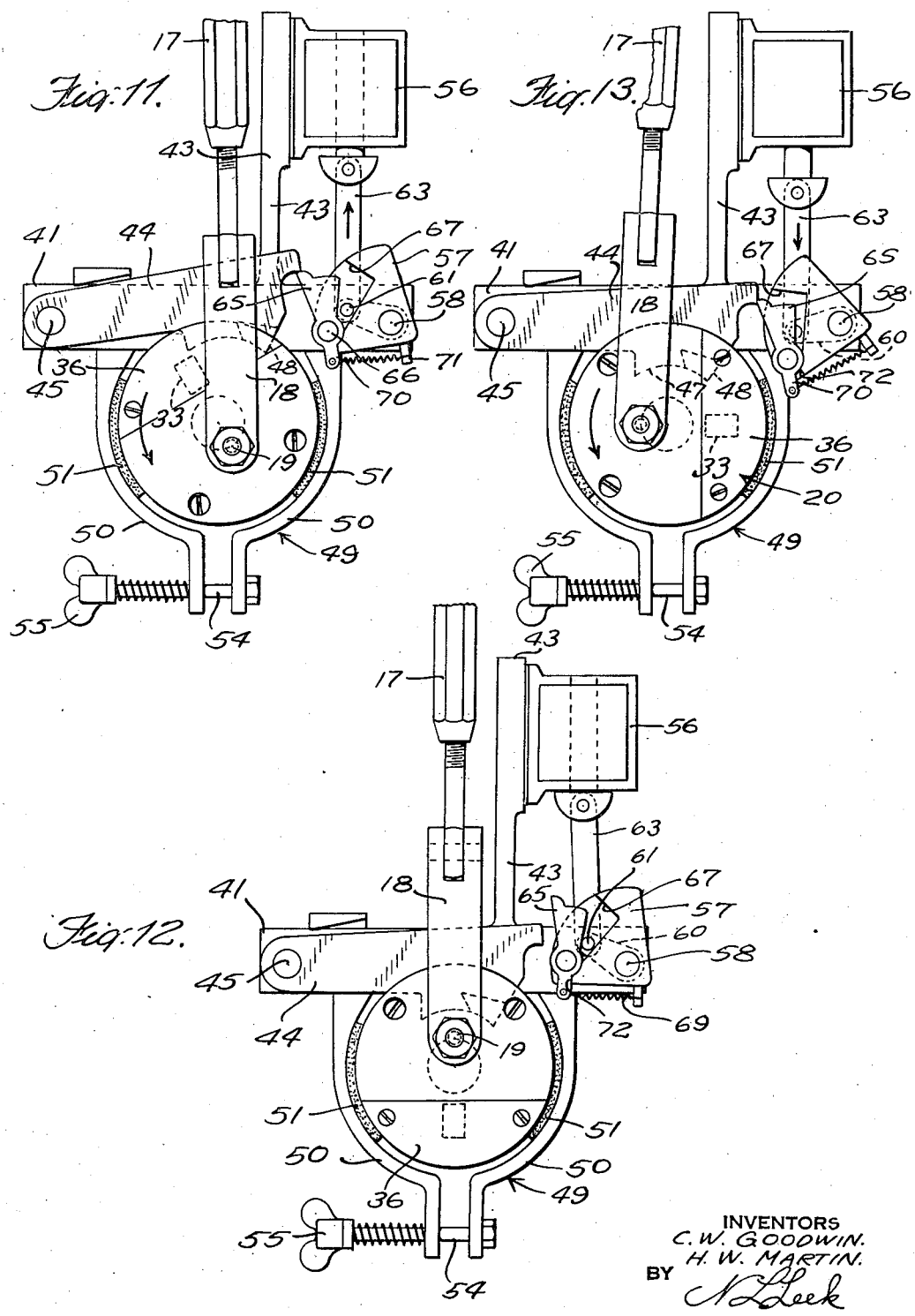

Patented July 12, 1949

2,475,740

UNITED STATES PATENT OFFICE 2,475,740

ONE-REVOLUTION CLUTCH

Carl W. Goodwin, Plainfield, N. J., and Harold W. Martin, Malverne, N. Y., assignors to American Seal-Kap Corporation of Delaware, Wilmington, Del., a corporation of Delaware Application April 23, 1946, Serial No. 664,388

2 Claims. (Cl. 192—24)

This invention relates to clutch control mechanisms of the type which when energized are operative to connect a normally stationary rotatably supported member to a constantly rotating shaft and to automatically disconnect them after the member has been rotated through one complete revolution and to hold them disconnected until the control mechanism is again energized.

The principal object of the invention is to provide improved mechanical means for releasing an electromagnet-actuated element after it has been moved a predetermined amount, and which will prevent another actuation of said element except as required in the proper operation of the machine with which it cooperates.

Other and more limited objects of the invention will be apparent from the following specification and the accompanying drawings forming a part thereof.

For the purpose of illustration, the invention is shown and described herein in connection with a machine for applying hood caps to milk bottles, such as is disclosed in the patent to Carl W. Goodwin et al. No. 2,325,163, and it is an improvement on the clutch control mechanism disclosed in the patent to Ludwig F. Boschen No. 2,325,102.

A machine of the above type includes a magazine containing stacks of nested preformed caps which are fed into a supply chamber from which they are successively picked by a special picker mechanism and are then advanced along a feed chute until they reach a cap applying station. At the last-mentioned station the caps are successively picked off by the necks of advancing milk bottles which carry them to a sealing station, where the skirts of the caps are folded around the necks of the respective milk bottles and sealed in place, all of which operations are fully described in the above-mentioned Goodwin et al. patent and form no part of the present invention.

The feed of caps in a machine of the above type is so synchronized with respect to the feed of the milk bottles that the caps are successively fed to the capping station to meet the advancing milk bottles as they pass such station. The picker mechanism, by which the caps are picked, one-by-one from the supply chamber and deposited in the feed chute, includes a bottle-actuated switch actuating a picker solenoid. Each time the solenoid is energized the picker mechanism should operate once, to pick a single cap from the supply chamber and deposit it in the feed chute. However, if the bottle-actuated switch should be held closed too long by a bottle, for example, due to stoppage of the bottle feed or due to the feed operating slowly, the picker mechanism may continue to operate to pick more than one cap from the supply chamber.

The present invention eliminates the foregoing difficulty and prevents more than one actuation of the picker mechanism for each energization of the picker solenoid regardless of the length of time the solenoid remains energized. This is accomplished by means of a novel mechanical release which is interposed between the solenoid armature, and a one-revolution clutch or other mechanism which is actuated thereby to operate the picker. This releasable element is operated positively whenever the solenoid is energized, and when so operated it actuates the picker. Immediately after such operation, however, the releasable element is automatically released and returned to its normal position of rest, thus preventing further operation of the picker until the solenoid has been deenergized and then subsequently energized again as by the next succeeding operation of the bottle-actuated switch.

The invention is also applicable to various other types of machines wherein an element is driven through one complete cycle and is then released and held until conditions again require its operation.

In the drawings:

Fig. 1 is a fragmentary section through a portion of a hood cap applying machine of the above mentioned type, showing in elevation a one revolution clutch mechanism embodying the present invention as applied to the cap picker;

Fig. 2 is a front elevation of the one revolution clutch and the control mechanism therefor, as viewed from the position indicated by the lines 2—2 of Fig. 1;

Fig. 3 is a central vertical section through the clutch and control mechanism, the plane of the section being indicated by the line 3—3 of Fig. 2;

Fig. 4 is a horizontal section taken on the line 4—4 of Fig. 2;

Fig. 5 is a view similar to Fig. 4 taken on the line 5—5 of Fig. 2;

Fig. 6 is a transverse section through the clutch showing the clutch ratchet, the plane of the section being indicated by the line 6—6 of Fig. 3;

Fig. 7 is a detail perspective view of the clutch dog;

Fig. 8 is a detail perspective view of the trip latch;

Fig. 9 is a detail perspective view of the trip latch finger;

Fig. 10 is a detail perspective view of the trip lever;

Fig. 11 is a view similar to Fig. 2 showing the clutch lever lifted to permit engagement of the clutch but not yet released by the trip latch finger;

Fig. 12 is a view similar to Figs. 2 and 11 showing the trip latch and finger just after they have lifted and released the trip lever and before they have returned to initial positions, but after the trip lever has fallen back by gravity into position to disengage the clutch after one revolution; and Fig. 13 is a view similar to Figs. 2, 11 and 12 showing the trip latch and finger returning to initial positions.

Referring to the drawing more in detail, Fig. 1 shows a portion of a cap picker of the type disclosed in the above-mentioned Goodwin et al. patent and includes a stationary frame 5 attached to a pedestal 6 which is adapted to rest upon the floor in a convenient position with respect to the bottle filling machine.

The frame 5 supports a cap supply chamber 2 into which the preformed caps 8 are fed in a manner disclosed in the said Goodwin et al. patent. The picker mechanism for picking the caps from chamber 7 includes a cylindrical housing 9 mounted on the frame 5, and a sleeve 10 extending outwardly through housing 9 and carrying a collar 12 which is engaged by a forked arm 13 pivoted at 14 to a bracket 15 on the frame of the machine. The arm 13 is attached to one end of a link 17 by means of which the sleeve 10 and associated parts of the picker mechanism are reciprocated.

The picker mechanism is operated by a one revolution clutch which may be of any standard construction, one form of which is illustrated in Figs. 2, 3, 6 and 7. As shown therein, the other end of the link 17 is connected to a short link 18 which in turn is connected to a driving stud 19 eccentrically secured to the clutch housing 20.

The clutch housing consists of a front section 21 and a rear section 22 which are secured together by bolts 23. The rear section 22 of the clutch housing 20 encloses a clutch ratchet 24 having a plurality of ratchet teeth 25. The ratchet 24 is formed integrally with a hub 26 which is keyed to the armature shaft 27 of a motor 28, by a key 29. The clutch housing 20 is rotatably supported upon the forward end of the hub 26, which extends into a bore in the front section 21. A bushing 30 eliminates undue wear during operation. The front section 21 of the housing 20 has an annular groove 31 and a transversely extending slot 32 formed therein. A clutch dog 33 is slidably mounted in the slot 32 and is normally urged into engagement with the ratchet 24 by a spring 34 which is disposed within a recess 35 in the clutch dog 33 and compressed between the clutch dog and a cover plate 36 which closes the outer end of the slot 32. The clutch dog 33 is slotted as indicated at 37. One wall of the slot 37 is beveled to provide a cam surface 38, and the base of the slot is disposed slightly below the base of the groove 31. As long as the clutch dog 33 engages the ratchet 24 which is constantly rotating with the armature shaft 27 the clutch housing 20 will be rotated in unison therewith. The clutch housing through the eccentrically mounted driving stud 19 in turn will operate any mechanism connected thereto as long as it is rotating. But as soon as the dog 33 is withdrawn from the ratchet 24 the housing 20 will stop rotating and will remain stationary until the dog 33 again engages the ratchet 24.

The clutch dog 33 is actuated as desired by the mechanism which forms the subject matter of this application. This mechanism is all carried by a bracket 39 which is secured to the motor 28 above the clutch housing 20 by bolts 40. The bracket 39 comprises a horizontally disposed base 41 having downwardly extending sides 42 and an upwardly extending arm 43. A clutch trip lever 44 is secured at one end to a rock shaft 45 which is rotatably mounted in bearings 46 extending through the sides 42 of the bracket 39. The clutch lever 44 is disposed directly above the annular groove 31 in the clutch housing 20 and has a downwardly extending extension 47 at the free end thereof which rides in the groove 31. The lower end of the extension 47 is curved to conform to the base of the groove 31 and normally bears thereagainst. The forward end of extension 47 at the lower edge thereof is beveled to form a cam 48 which is adapted to engage the cam surface 38 of the clutch dog 33 to withdraw the dog 33 out of engagement with the ratchet 24. To engage the clutch the clutch trip lever 44 is raised from the position shown in Fig. 2 to the position shown in Fig. 11 which withdraws it from engagement with the clutch dog 33. The spring 34 is then free to slide the dog 33 toward the constantly rotating ratchet 24 into engagement with one of the teeth 25. The clutch housing is then rotated. The clutch trip lever 44 can then be released and allowed to drop back to its normal position as shown in Fig. 2. The speed of operation is such that the clutch trip lever 44 can be raised, to start the clutch housing 20 rotating, and lowered back to its normal position in the groove 31 before the clutch housing 20 and clutch dog 33 make one complete revolution, as shown in Fig. 12. The cam 48 is then in position to engage the cam surface 38 of the dog 33 and withdraw it from the ratchet 24 thus stopping rotation of the clutch housing 20 after one revolution. A brake, generally indicated by the numeral 49, which constantly engages the rear section 22 of the clutch housing 20 keeps the clutch housing from overrunning and carrying the dog 33 past the extension 47 of the clutch trip lever 44, after the dog has been withdrawn from the ratchet 24 by the cam 48.

The brake 49 comprises two brake shoes 50 having suitable brake lining 51 secured thereto. The shoes are pivotally mounted upon studs 52, extending between the sides 42 of the bracket 39, and are urged toward each other into engagement with the clutch housing 20 by a spring 53 on a bolt 54 which extends through the lower ends of the shoes 50. The pressure of the spring 53 may be adjusted by a wing nut 55 on the bolt 54.

The clutch trip lever 44 is raised through suitable mechanism to effect operation of the cap dispensing mechanism, by a solenoid 56 which is energized by a bottle-actuated switch on a capping machine (not shown). This mechanism is so constructed and arranged that the clutch housing 20 can only be rotated one revolution for each energization of the solenoid. The solenoid must be deenergized and the mechanism returned to original position before the clutch trip lever 44 can again be raised to effect operation of the clutch. The action of this mechanism is illustrated in Figs. 2, 11, 12 and 13.

A clutch trip latch 57 is rigidly secured to one end of a shaft 58 rotatably mounted in bearing 59 in the sides 42 of the bracket 39. A link 60 is rigidly secured to the other end of the shaft 58. A pin 61, which extends through elongated slots 62 in the sides 42 is connected at one end thereof to the free end of the link 60 and at the other end thereof to the clutch trip latch 57. The pin 61 extends through an aperture in the lower end of a link 63 which is pivotally connected at its upper end to the core 64 of the solenoid 56. A trip finger 65 is pivotally secured at 66 to the trip latch 57, within a recess 67 therein. The trip finger 65 is disposed in alignment with the clutch trip lever 44 and normally extends under a hook 68 on the free end of the trip lever, as shown in Fig. 2. A spring 69 secured at one end to an arm 70 of the finger 65 and at the other end thereof to a pin 71 carried by the trip latch 57 normally urges the trip finger outwardly from the recess 67. This outward movement is limited by the arm 70 abutting a shoulder 72.

When the solenoid 56 is energized the clutch trip latch 57, and the trip finger carried thereby, are rotated from the position shown in Fig. 2 to the position shown in Fig. 12; and then when the solenoid is de-energized the latch 57 will drop by gravity back to the position shown in Fig. 2. During the initial part of this movement the trip finger 65 will engage the hook 68 and raise the free end of the trip lever 44 to the position shown in Fig. 11 which releases the clutch dog 33 and allows the spring 34 to move it into engagement with ratchet 24, engaging the clutch. After a very slight further movement of the trip latch 57 beyond the position shown in Fig. 11 towards the position shown in Fig. 12, the trip finger 65 will release the trip lever 44 allowing it to drop back by gravity to the position shown in Fig. 12 before the clutch housing has made a complete revolution so that it is in position to engage and withdraw the dog 33 and disengage the clutch at the end of one complete revolution thereof. After the solenoid 56 has been de-energized the trip latch will drop by gravity back to the position shown in Fig. 2 and in so doing it will pass through the position shown in Fig. 13, when the trip finger 65 is forced back into the recess 67 by the hooked end 68 of the trip lever 44 against the tension of the spring 69. After the end of the trip lever 65 has passed the hook 68 the spring 69 will move it back beneath the hook 68, as shown in Fig. 2, where it is ready to effect engagement of the clutch when the solenoid 56 is again energized.

The shape and weight of the trip latch 57 and its connection to the shaft 58 are such that it will quickly drop back by gravity to its normal position after each actuation without the use of springs.

From the foregoing, it will be seen that the clutch housing 20 will make only one revolution each time the solenoid 56 is energized, and that this will be true regardless of the length of time the solenoid remains energized. Thus, when this novel mechanical release is employed as illustrated with the picker mechanism of a capping machine, the trip lever 44 controlling the clutch mechanism will be raised to effect engagement of the clutch each time the solenoid 56 is energized and then automatically released so that it can return to its normal position of rest in time to prevent further operation of the picker mechanism until the solenoid has been deenergized and then subsequently energized as by the next succeeding operation of the bottle-actuated switch.

Although a specific embodiment of the invention has been shown for purposes of illustration, it is to be understood that various changes and modifications may be made therein as will be readily apparent to a person skilled in the art. Furthermore, the mechanical releasing mechanism of the invention may, of course, be used for various other purposes and in various other types of machines, without departing from the scope and spirit of the invention as defined in the appended claims.

What is claimed is:

1. In a device of the character described, the combination of a constantly rotating driving member, a driven member, a clutch dog slidably mounted in said driven member adapted to engage said driving member to form a driving connection between said driving member and said driven member, means urging said clutch dog into engagement with said driving member, a pivoted trip lever normally engaging and holding said clutch dog out of engagement with said driving member, a trip latch pivotally mounted adjacent the free end of said trip lever, a trip finger pivotally mounted upon and eccentric with said trip latch said finger having its free end extending upwardly in alignment with said trip lever, a spring holding the free end of said finger in the path of movement of the free end of said lever, and means to positively rotate said trip latch in the direction to first raise said trip finger into engagement with and lift said trip lever and upon further rotation to move said trip finger in its arc of movement out of engagement with said trip lever, whereby said trip lever is moved out of engagement with said clutch dog and immediately drops back in position to engage and withdraw said clutch dog after one revolution of said driven member said spring being arranged to allow retraction of said finger past the free end of said lever during the reverse rotation of said latch.

2. In a device of the character described the combination of a constantly rotating driving member, a driven member, a clutch through which said driven member is rotated by said driving member, means urging said clutch into driving engagement with said driving member, a bracket secured in position about said driven member, a trip lever pivoted at one end to the side of said bracket above said clutch and having a depending portion normally disposed to hold said clutch out of engagement with said driving member, a trip latch pivoted to the side of said bracket with the free end thereof adjacent the free end of said trip lever, a trip finger pivoted eccentrically to said trip latch, said finger having its free end extending upwardly in alignment with the free end of said trip lever, a spring holding the free end of said finger in the path of movement of the free end of said lever, an upwardly extending arm on said bracket, a solenoid secured to the upper end of said arm, operative connections between said solenoid and said latch through which upon energization of said solenoid said latch is positively rotated in a direction to first bring said finger into engagement with and raise the free end of said trip lever to move said lever out of engagement with said clutch and effect engagement of said driving and driven members and upon further rotation of said latch to move said finger in its arc of movement out of engagement with said lever to allow said lever to drop back into position to engage and withdraw said clutch out of engagement with said driving member after one revolution of said driven member, said latch being weighted to drop back to initial position by gravity when said solenoid is deenergized and said spring being arranged to allow retraction of said finger as it passes the end of said lever during the reverse rotation of said latch.

CARL W. GOODWIN.
HAROLD W. MARTIN.

REFERENCES CITED

The following references are of record in the file of this patent:

UNITED STATES PATENTS

| Number | Name | Date |
|---|---|---|
| 489,849 | Crain | Jan. 10, 1893 |
| 957,929 | Bartlett | May 17, 1910 |
| 1,215,972 | Nuberg | Feb. 13, 1917 |
| 1,471,350 | Piaser | Oct. 23, 1923 |
| 2,325,102 | Boschen | July 27, 1943 |